United States Patent [19]

Bailey

[11] 4,241,131

[45] Dec. 23, 1980

[54] MOLDABLE POLYURETHANE FOAM-BACKED FABRICS

[75] Inventor: Robert J. Bailey, Coraopolis, Pa.

[73] Assignee: Mobay Chemical Corporation, Pittsburgh, Pa.

[21] Appl. No.: 909,156

[22] Filed: May 24, 1978

[51] Int. Cl.$^3$ ............................................. B29D 27/04
[52] U.S. Cl. ...................... 428/262; 264/26; 264/45.3; 264/45.8; 264/46.4; 264/257; 264/321; 428/290; 428/310; 521/170
[58] Field of Search ............... 264/45.8, 46.3, 46.4, 264/321, 26, 45.3, 257; 428/262, 290, 310; 521/170

[56] References Cited

U.S. PATENT DOCUMENTS

| | | | |
|---|---|---|---|
| 2,914,109 | 11/1959 | Hsu et al. | 264/321 X |
| 2,946,713 | 7/1960 | Dusina et al. | 264/321 X |
| 3,012,283 | 12/1961 | Foster | 264/321 X |
| 3,046,177 | 7/1962 | Hankins | 264/46.3 X |
| 3,104,192 | 9/1963 | Hacklander | 264/321 X |
| 3,175,936 | 3/1965 | Squier et al. | 264/46.4 X |
| 3,210,447 | 10/1965 | Cyr et al. | 264/46.3 |
| 3,378,432 | 4/1968 | Spencer | 264/321 X |
| 3,398,224 | 8/1968 | Spencer | 264/321 |
| 3,440,307 | 4/1969 | Printz | 264/46.4 |
| 3,453,351 | 7/1969 | Callahan | 264/46.3 |
| 3,518,102 | 6/1970 | Mertgen et al. | 264/46.3 X |
| 3,523,093 | 8/1970 | Stamberger | 260/2.5 R |
| 3,576,706 | 4/1971 | Baumann et al. | 428/425 |
| 3,652,639 | 3/1972 | Pizzini et al. | 260/2.5 AZ |
| 3,849,156 | 11/1974 | Marlin | 264/46.3 X |
| 3,860,537 | 1/1975 | Graham et al. | 260/2.5 BD X |

FOREIGN PATENT DOCUMENTS

| | | | |
|---|---|---|---|
| 551994 | 1/1958 | Canada | 264/45.8 |
| 2311378 | 9/1973 | Fed. Rep. of Germany | 264/46.3 |

Primary Examiner—Philip Anderson
Attorney, Agent, or Firm—Gene Harsh; Joseph C. Gil

[57] ABSTRACT

The invention relates to a process wherein (A) a heat curable froth or foamable mixture of polyurethane reaction components is applied to the back of a fabric, (B) the coated fabric is heated to form a gelled, tack-free and storable foam-backed fabric and (C) the fabric is shaped and cured using a hot molding process. The polyurethane formulation contains a hydroxy functional ester of an acrylic or alkyl acrylic acid and a free radical initiator.

13 Claims, No Drawings

MOLDABLE POLYURETHANE FOAM-BACKED FABRICS

BACKGROUND OF THE INVENTION

This invention is an outgrowth of the development of molded polyurethane foam-backed fabrics (and, particularly carpets) which are sufficiently stiff upon demolding to retain their shape and yet are not so stiff that they crack when bent. The process for making such foamed-backed fabrics involves the application of a heat curable froth or foamable mixture of polyurethane reaction components to the back of a fabric. The polyurethane is then cured, normally under heat, to a tack-free, gelled state. The fabric is then cut into sized pieces and molded to the desired shape.

The general drawback to this process is the difficulty in formulation a system which can undergo the above mentioned steps in an industrial setting. Until now, it has not been possible to produce a tack-free, gelled foam backing which could be stored for long periods of time, be cut into a desired sized piece when needed, and molded in a reasonably short period of time into a molded part which will retain its shape while at the same time not being so stiff that it will crack if bent.

The general method of applying foam to a fabric substrate and subsequently molding the laminate into a desired shape is known e.g. U.S. Pat. Nos. 3,175,936; 3,046,177; 3,440,307; 3,772,224; 3,849,156 and 3,175,936. None of these methods, however, permits the foam-backed fabric to be stored for prolonged periods and then be hot molded at a much later time into excellent contoured laminates.

In U.S. Pat. No. 3,860,537, a foam which is storable in a roll is produced and is capable of being molded at a later time. The method requires the use of a significant quantity of an ethylenically unsaturated polyester together with an ethylenically unsaturated monomer copolymerizable with the polyester. The shortcoming of the process is that the curing/molding step requires molding times of 30-35 minutes (note Examples 1 and 10) which is an economically unacceptably long time. The patent also fails to suggest applying the foamable reaction mixture to the back of a fabric, or in fact to any substrate.

The present invention utilizes a hydroxy functional acrylate and a free radical initiator as a means of overcoming the lengthy mold time. The use of hydroxy functional acrylates is not new to the polyurethane art. For example, there are the polymer polyols e.g. U.S. pat. Nos. 3,383,351; 3,652,639; 3,523,093 and 3,576,706. There are a number of coating applications described in U.S. Pat. Nos. 3,975,457; 3,919,351; 3,989,609. There are also patents such as U.S. Pat. No. 3,954,584 directed to a photo polymerizable vinyl urethane composition and U.S. Pat. No. 4,052,282 directed to a photocurable bandage. However, as far as Applicant is aware, there is no prior art directed to the specific application of producing a curable and moldable polyurethane foam which has been applied to a fabric substrate.

DESCRIPTION OF THE INVENTION

The present invention provides a process for preparing molded polyurethane foam-backed fabric where the polyurethane reaction mixture can be applied to the fabric without significant reaction so that it can be easily handled. The fabric is then heated to form a gelled and tack-free foam laminate which can be stored for long periods of time prior to shaping and molding. In addition, the foam-backed fabric can be molded in very short cycle times of as little as 30 seconds to 1 minute and form a fabric with good shape retention.

The invention relates to a process for preparing a molded, polyurethane foam-backed fabric comprising the steps of:

(A) applying a foamable mixture or froth of polyurethane reaction components to the back of a fabric, said reaction components comprising
  (1) a polyisocyanate;
  (2) an organic compound containing at least two hydrogen atoms capable of reacting with isocyanate groups, having a molecular weight of between 400 and 16,000 and containing essentially no ethylenically unsaturated groups;
  (3) hydroxy containing esters of acrylic or alkyl acrylic acids and preferably hydroxy acrylates of the formula:

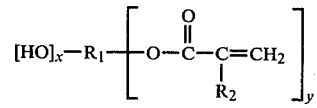

wherein
  $R_1$ is an $x+y$ valent, optionally branched, $C_1$-$C_{18}$ alkylene, arylene or aralkylene group;
  $R_2$ is H or a $C_1$-$C_{18}$ alkyl group
  x and y are integers which may be the same or different and represent 1–8, with the proviso that $x+y$ does not exceed 8;
  (4) a free radical initiator;
  (5) a heat activated catalyst for the reaction between components (1) and (2);
  (6) a blowing agent, or inert gas for frothing;
  (7) a surface active agent for foam stability;

(B) heating the coated fabric for from 15 seconds to 10 minutes at about 80°-250° F. to allow the polyurethane reaction to proceed to produce a gelled, tack-free polyurethane foam, and (C) shaping and curing the resultant foam-backed fabric by a hot molding process.

The preferred hydroxy acrylates are those of the above mentioned formula in which $R_1$ is $C_1$-$C_4$ alkylene and $R_2$ is H or —$CH_3$, and x and y each equal 1. The most preferred materials are 2-hydroxy ethyl acrylate and 2-hydroxy propyl acrylate.

The hot molding process of step (C) can include placing the foam-backed fabric in a heated mold where at least the polyurethane side is subjected to temperatures of from 200° to 350° F. and a pressure of from 0.1 to 20 psi for anywhere from 15 seconds to 5 minutes. Alternatively, the foam-backed fabric can itself be heated to a temperature of from 200° to 350° F. and then shaped in an unheated mold under the same pressure and time conditions. The heating of the foam-backed fabric is preferably done while the fabric is laid out flat and can be accomplished by any of the methods commonly used in the art, such as forced hot air, infrared radiation, microwave radiation and the like.

The ability to store the fabric prior to shaping and molding and yet form a molded fabric with excellent properties is thought to be particularly due to the use of the hydroxy functional acrylate and free radical initiator which is primarily activated only at the molding temperature.

Suitable hydroxyl group containing esters include 2-hydroxyethyl acrylate, 2-hydroxypropyl acrylate, 2-hydroxyethyl methacrylate, 2-hydroxypropyl methacrylate, 4-hydroxybutyl acrylate, hydroxyoctyl methacrylate and the like and mixtures thereof.

Also suitable are partially acrylated polyols such as pentaerythritol mono, di- and tri-acrylate, trimethylol propane diacrylate, mannitol acrylates, sucrose acrylates and the like. It would, of course, also be possible to alkoxylate a polyol to produce a polyether polyol and then to partially acrylate the polyether polyol with acrylic acid or an alkylacrylic acid. Various other hydroxy functional acrylates used in the present process and their methods of preparation are known. In general a diol or polyol is reacted with acrylic, methacrylic or other alkyl acrylic acids in amounts sufficient to form a compound containing at least one hydroxyl group, and at least one acrylate, methacrylate or alkyl acrylate group. Thus, any compound containing at least one hydroxyl group and at least one acrylate or alkyl substituted acrylate group would be effective. The acrylate can be used in amounts ranging from 0.5 to 50, preferably from 5 to 20 and most preferably from 8 to 15 parts by weight per 100 parts by weight of component (2).

Suitable free radical initiators include those well known to initiate the polymerization of carbon-carbon double bonds and preferably which have a half-life of less than 1 minute at the molding temperatures. Such initiators include, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene, hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)-peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, $\alpha$-methylbenzyl hydroperoxide, $\alpha$-methyl-$\alpha$-ethyl benzyl hydroperoxide. Tetralin hydroperoxide, triphenylmethyl hydroperoxide, diphenylmethyl hydroperoxide, $\alpha,\alpha$-azo-2-methyl butyronitrile, $\alpha,\alpha$-2-methyl heptonitrile, 1,1'-azo-1-cyclohexane carbonitrile, dimethyl $\alpha,\alpha'$-azoisobutyrate, 4,4'-azo-4-cyanopentanoic acid, azobis-(isobutyronitrile), persuccinic acid, diisopropyl peroxy dicarbonate, and the like; a mixture initiators may also be used. Azobis(isobutyronitrile) dissolved in a minimum amount of a suitable solvent is the preferred initiator.

It is preferred to use from 0.01 to 1 part of initiator per 100 parts by weight of component (2), most preferably from 0.05 to 0.5 part.

In addition to the hydroxy functional acrylate used in the present process, it is possible to use in addition thereto other hydroxy functional compounds containing ethylenically unsaturated groups. From 0 to 50 parts by weight per 100 parts of component 2 and, preferably from 8 to 15 parts can be used. Examples of such compounds include hydroxy terminated butadiene homopolymers, hydroxy-terminated butadiene-styrene copolymers and hydroxy terminated butadiene-acrylonitrile copolymers available from ARCO, trimethylol propane di-2-propenyl ether, and the like. These compounds are not in themselves sufficiently active to provide molded fabrics which are sufficiently stiff to retain their shapes. They also tend to be too insoluble in the polyol blend to be storage stable for any prolonged period of time.

While the process for making the polyurethane backed fabrics can generally utilize any known formulation for making polyurethane foams, certain preferred general formulations have been found to be most advantageous in optimizing the backed fabric properties. In general, in addition to the polyisocyanate, compounds containing active hydrogen atoms, silicone surfactant, heat activated catalyst and blowing agent or inert gas for frothing, it is useful to include a chain extender and substantial amounts of an inorganic filler.

As is known in the art, compounds useful in preparing polyurethane foams include organic compounds with at least two hydrogen atoms capable of reacting with isocyanates and having molecular weights of from about 400 to 16,000. The active hydrogen containing compounds used in the present invention should contain essentially no ethylenically unsaturated groups.

As is recognized in the art, most polyether polyols will contain very small amounts of terminal unsaturated groups. By "essentially no ethylenically unsaturated groups" is meant that component (2) does not contain so many ethylenically unsaturated groups that they begin to take a significant part in the free radical polymerization during step (C) with the carbon-carbon double bonds of the acrylate. Apart from compounds containing amino groups, thiol groups or carboxyl groups, compounds of this type which are preferred are polyhydroxyl compounds. Particularly preferred compounds are those containing 2 to 8 hydroxyl groups, and especially those with molecular weights of from 800 to 10,000 (most preferably 1,000 to 6,000). Examples include, polyesters, polyethers, polythioethers, polyacetals, polycarbonates and polyesteramides containing at least 2 and generally 2 to 8 and preferably 2 to 4 hydroxyl groups, of the type known per se for the production of homogeneous and cellular polyurethanes.

Examples of suitable polyesters containing hydroxyl groups include reaction products of polyhydric, preferably dihydric, and, optionally, trihydric alcohols with polyvalent, preferably divalent carboxylic acids. Instead of the free polycarboxylic acids the corresponding polycarboxylic acid anhydrides or esters with lower alcohols or mixtures thereof may also be used for the production of the polyesters. The polycarboxylic acids may be aliphatic, cycloaliphatic, aromatic and/or heterocyclic, and may optionally be substituted, for example, by halogen atoms. Examples of these polycarboxylic acids are succinic acid, adipic acid, suberic acid, azelaic acid, sebacic acid, phthalic acid, isophthalic acid, trimellitic acid, phthalic acid anhydride, hexahydrophthalic acid anhydride, glutaric acid anhydride. Examples of suitable polyhydric alcohols include ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl-cyclohexane), 2-methyl 1,3-propane diol, glycerol, trimethylol-propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters glycols of lactones, for example, ε-caprolactone, or hydroxycarboxylic acids, for example, Ω-hydroxycaproic acid, may also be used.

Polyethers containing at least two and usually two to eight, and preferably two to three hydroxyl groups suitable for use in accordance with the invention, include those obtained by the polymerization of epoxides, such as ethylene oxide, propylene oxide, butylene oxide, tetrahydrofuran, styrene oxide or epichlorohydrin, for example, in the presence of $BF_3$, or by the chemical addition of these epoxides to starting components with reactive hydrogen atoms, such as water, ethylene glycol, 1,2- or 1,3-propylene glycol, trimethylolpropane, 4,4'-dihydroxydiphenylpropane, aniline, ammonia, ethanolamine and ethylene diamine, tolylene diamine 4,4'-diaminodiphenyl methane, and the like. In many cases, it is preferred to use polyethers of the type which contain primary OH-groups (e.g., either by tipping the polyol with ethylene oxide or by using a polyether containing as much as 90% by weight of primary OH groups or based on all the OH-groups present in the polyether).

Among the polythio-ethers usable are included the condensation products of thiodiglycol with itself and/or with other glycols, dicarboxylic acids, formaldehyde, aminocarboxylic acids or aminoalcohols. Depending on the cocomponents, these products are polythio-mixed ethers, polythio-ether esters or polythioether ester amides.

Suitable polyacetals include those compounds which may be obtained from glycols, such as diethylene glycol, triethylene glycol, and hexane diol, and formaldehyde. Polyacetals suitable for the purposes of the invention may also be obtained by polymerizing cyclic acetals.

Suitable polycarbonates containing hydroxyl groups include those obtainable by reacting diols, such as 1,3-propane diol, 1,4-butane diol and/or 1,6-hexane diol, diethylene glycol, triethylene glycol and tetraethylene glycol, with diarylcarbonates, such as diphenylcarbonate or phosgene.

Examples of polyester amides and polyamides include the predominantly linear condensates obtained from polyvalent saturated carboxylic acids or their anhydrides and polyhydric, saturated amino alcohols, diamines, polyamines and mixtures thereof.

Polyhydroxyl compounds already containing urethane or urea groups and modified natural polyols, such as castor oil, carbohydrates and starch, may also be used. The addition products of alkylene oxides with phenol-formaldehyde resins or even with urea-formaldehyde resins may also be used in accordance with the invention.

Further examples of suitable active hydrogen containing compounds are known and can be found, e.g., in High Polymers, Vol. XVI, "Polyurethanes, Chemistry and Technology" by Saunders-Frisch, Interscience Publishers, New York, London Vol. I, 1962, pages 32 to 42, and Vol. II, 1964, pages 5 to 6 and 198 and 199, and in Kunststoff-Handbuch, Vol. VII, Vieweg-Hochtlen, Carl-Hanser-Verlag Munich, 1966, pages 45 to 71.

The most preferred high molecular weight compounds containing active hydrogen groups are polyethers with a high primary hydroxyl content. They include compounds having a molecular weight of from about 400 to 10,000, and preferably from 2,000 to 6,000, and having hydroxyl numbers of from about 15 to 100, and preferably from 28 to 56.

Polyesters are generally not preferred because of their hydrolytic instability.

It is preferred but not necessary that a chain extender be used in the resin formulation. Such extenders include compounds having molecular weights of from 32 to about 400 which contain at least two hydrogen atoms capable of reacting with isocyanates. These include compounds containing hydroxyl groups and/or amino groups and/or thiol groups and/or carboxyl groups, and preferably compounds containing hydroxyl groups and/or amino groups. They generally contain from 2 to 8 hydrogen atoms capable of reacting with isocyanates, and preferably contain 2 or 3 such hydrogen atoms. The following are mentioned as examples of such compounds: ethylene glycol; propylene glycol—(1,2) and —(1,3); butylene glycol —(1,4), —(1,3) and —(2,3); pentanediol-(1,5); hexanediol-(1,6); octanediol-(1,8); neopentylglycol; 1,4-bis-hydroxymethylcyclohexane; 2-methyl-1,3-propanediol; glycerol; trimethylolpropane; hexanetriol-(1,2,6); trimethylolethane; pentaerythritol; quinitol; mannitol and sorbitol; diethylene glycol; triethylene glycol; tetraethylene glycol; polyethylene glycols having a molecular weight of up to 400; dipropylene glycol, polypropylene glycols having a molecular weight of up to 400; dibutylene glycol; polybutylene glycols having a molecular weight of up to 400; 4,4'-dihydroxy diphenylpropane; di(hydroxyethyl)hydroquinone; ethanolamine; diethanolamine; triethanolamine; 3-aminopropanol; ethylenediamine-1,3-diaminopropane; 1-mercapto-3-aminopropane; 4-hydroxyphthalic acid or 4-aminophthalic acid; succinic acid, adipic acid; hydrazine; N,N'-dimethylhydrazine, 4,4'-diaminodiphenylmethane, tolylene diamine and diethyl tolylene diamine. Mixtures of these various compounds may also be used.

These extenders may generally be used in, amounts varying from about 0.5 to about 30 parts by weight, preferably 5 to 15, based on the total amount of abovementioned higher molecular weight active hydrogen containing compound (2).

The isocyanates suitable for the process according to the invention include essentially any organic polyisocyanate such as aliphatic, cycloaliphatic, araliphatic, aromatic and heterocyclic polyisocyanates of the type known and described, for example, by W. Siefken in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-5-isocyanatomethyl-cyclohexane (German Auslegeschrift No. 1,202,785); 2,4- and 2,6-hexahydrotolylene diisocyanate, and mixtures of these isomers; hexahydro-1,3- and/or 1,4-phenylene diisocyanate; perhydro-2,4' and/or -4,4'-diphenylmethane diisocyanate; 1,3- and 1,4-phenylene diisocyanate; 2,4- and 2,6-tolylene diisocyanate, and mixtures of these isomers; diphenylmethane 2,4'-and/or -4,4'-diisocyanate; naphthylene-1,5-diisocyanate; triphenylmethane-4,4',4''-triisocyanate; polyphenylpolymethylene polyisocyanates of the type obtained by condensing aniline with formaldehyde, followed by phosgenation and described, for example, in the British Pat. Nos. 874,430 and 848,671; perchlorinated arylpolyisocyanates of the types described, for example, in German Auslegeschrift No. 1,157,601; polyisocyanates containing carbodiimide groups of the type described in German Pat. No. 1,092,007; diisocyanates of the type described in U.S. Pat. No. 3,492,330; polyisocyanates containing allophanate groups of the type described, for example, in British Patent 994,890, Belgian Pat. No. 761,626 and published Dutch Patent Application No. 7,102,524; polyisocyanates containing isocyanurate groups of the type described, for example, in German Pat. Nos. 1,022,789; 1,222,067 and 1,027,394 and German Offenlegungsschriften Nos. 1,929,034 and 2,004,048; polyisocyanates containing urethane groups of the type described, for example, in Belgian Pat. No. 752,261 or U.S. Pat. No. 3,394,164; polyisocyanates containing acylated urea groups as disclosed in German Pat. No. 1,230,778; polyisocyanates containing biuret groups of the type described, for example, in British Pat. No. 956,474 and 1,072,956, U.S. Pat. No. 3,567,763 and German Pat. No. 1,231,688; and reaction products of the aforementioned isocyanates with acetals as described in German Pat. No. 1,072,385. It is also possible to use the distillation residues containing isocyanate groups accumulating in the commercial production of isocyanates, optionally dissolved in one or more of the aforementioned polyisocyanates. It is also possible to use mixtures of the aforementioned polyisocyanates.

In general, it is preferred to use the readily available polyisocyanate such as 2,4- and 2,6-tolylene diisocyanate and mixtures of these isomers ("TDI"). Particularly preferred are polyphenyl polymethylene polyisocyanates, of the type obtained by aniline-formaldehyde condensation and subsequent phosgenation ("crude MDI") in various isomeric distributions. The functionality of the crude MDI may vary from 2.0 to 4.0 but is preferably from 2.5 to 3.0. The volatility of tolylene diisocyanate generally deters its advantageous use under many circumstances.

Also suitable are polyisocyanates containing carbodiimide groups, urethane groups, allophanate groups, isocyanurate groups, urea groups or biuret groups ("modified polyisocyanates").

Isocyanate terminated prepolymers may also be used in the process of the invention. Such prepolymers are made by reacting a stoichiometric excess of a polyisocyanate with an active hydrogen containing compound. Blocked isocyanates which may be formed by adding a monofunctional organic compound such as phenol to a polyisocyanate may also be used.

In general, it is preferred that the foam index (eq. of NCO/ eq. of active hydrogens) be in the range from about 100 to about 200, and preferably from 125 to 150.

A particularly advantageous embodiment of the invention is the pre-reacting of at least part of the polyisocyanate used as component (1) with the hydroxy functional acrylate, component (3). Acrylates are known irritants to a number of susceptible people. Thus, by this method, the acrylate need only be handled once and need not be contained as a volatile component in the resin blend system which is often transported from the manufacturer to the processor as a blend. This prepolymer can be prepared by reacting all or part of the polyisocyanate with the hydroxy acrylate under typical conditions known for the preparation of NCO-terminated prepolymers with other hydroxy functional compounds.

It is preferred to prepare a froth of the reaction components rather than using blowing techniques normally used to make foams i.e. with the use of water and/or Freon. Froths are normally prepared by dispersing an inert gas throughout the reaction mixture to form a heat curable froth. With the use of heat activated catalysts, the froth is basically structurally and chemically stable and workable at ambient conditions. Frothing techniques are well known and are described, for example, in U.S. Pat. Nos. 3,108,976; 3,849,156 and 3,772,224. Sufficient air or inert gas is included to produce foams of desired density. The density of the froth is essentially the same as the foam product.

Readily volatile organic substances may be also used as blowing agents in the production of the polyurethane foams. Suitable organic blowing agents include halogen-substituted alkanes, such as methylene chloride, chloroform, ethylidene chloride, vinylidene chloride, monofluorotrichloromethane, chlorodifluoromethane, and dichlorodifluoromethane; butane; hexane; heptane; or diethylether. A blowing effect, may also be obtained by adding compounds which decompose spontaneously at temperatures above room temperature, giving off gases such as nitrogen. Further examples of blowing agents and details of the use of blowing agents may be found in Kunststoff-Handbuch Vol. VII, published by Vieweg and Hoechtlen, Carl-Hanser-Verlag, Munich 1966, for example, on pages 108 and 109, 453 to 455 and 507 to 510. These blowing agents may be used in amounts from 0 to 10 parts by weight per 100 parts of components (2), (3), (4), (5) and (7).

When using the amidine heat activated catalysts discussed below, it is preferred to use a carboxylic acid (preferably aliphatic and optionally halogen substituted) with from 1–30 carbon atoms and which may be mono or difunctional. They may be used exclusively or in addition to the above mentioned blowing agents. Particularly preferred among this group are oleic acid, lauric acid, trichloroacetic acid, cyanoacetic acid, phthalic acid, adipic acid, propionic acid, butyric acid, fumaric, isophthalic, terephthalate, ricinoleic, stearic, cyclohexanecarboxylic acid, $\omega$-hydroxy caproic acid and polyesters of dicarboxylic acids and glycols which have a high acid number. These acids may be used in amounts varying from 0 to about 5 parts by weight per 100 parts of Components (2), (3), (4), (5) and (7) preferably from 0.01 to 2 parts by weight. It is also preferred to use in addition thereto from 0 to about 1 part by weight of water, most preferably from 0 to 0.1 part by weight.

Any of the many catalysts known in and/or used polyurethane chemistry may be used, including organotin compounds; tertiary amines; tertiary amines containing hydrogen atoms which can react with isocyanate groups; silamines with carbon-silicon bonds; nitrogen containing bases; alkali metal hydroxides, phenolates or alcoholates; hexahydrotriazines and the like. However, it is preferred to use a heat activated catalyst e.g. bicyclic and monocyclic amidine catalysts; nickel acetylacetonate or Union Carbide's LC 5613; catalysts produced by Witco (particularly UL 29); and Dabco WT and the like. Amidine catalysts are preferred. In fact, in order to allow for a reasonable working time in which the reaction mixture will remain stable and workable while it is being spread on the fabric, it is best only to use a heat activated catalyst.

Cyclic amidines usable as catalysts or accelerators in the instant invention are known and are described in U.S. Pat. No. 3,814,707. They are generally used in quantities of from about 0.001 to about 10 percent by weight, preferably from about 0.1 to about 5, and most preferably from about 0.3 to about 1 percent by weight (based on all the components). Suitable bicyclic amidines include compounds of the following general formula:

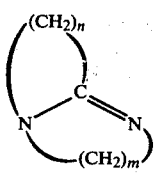

wherein m=2 or 3 and n=3, 4 or 5.

Suitable monocyclic amidines include compounds of the following general formula:

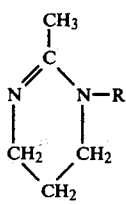

in which R represents an aliphatic, cycloaliphatic, araliphatic or aromatic group with 1 to 15 carbon atoms which may be branched and/or may contain hetero atoms. Examples of R include methyl, cyclohexyl, 2-ethylhexyl, benzyl, cyclohexylmethyl, ethoxy, or a group of the following formula:

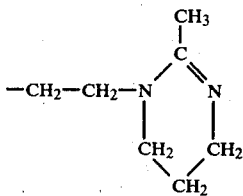

2,3-Dimethyl-3,4,5,6-tetrahydropyrimidine and 1,5-diazabicyclo[5.4.0]undec-5-ene are preferred catalysts according to the invention.

According to the invention, surface-active additives (emulsifiers and foam stabilizers) may also be used. Examples of emulsifiers include the sodium salts of castor oil sulphonates or of fatty acids or salts of fatty acids with amines, such as diethylamine/oleic acid or diethanol-amine/stearic acid. Alkali or ammonium salts of sulphonic acids, such as those of dodecyl-benzene sulphonic acid or dinaphthylmethane disulphonic acid, or even of fatty acids, such as ricinoleic acid, or of polymeric fatty acids, may also be used as surface-active additives.

Suitable foam stabilizers include water-soluble polyether siloxanes. These compounds are generally of such structure that a copolymer of ethylene oxide and propylene oxide is attached to a polydimethylsiloxane radical. Foam stabilizers of this type are described, for example, in U.S. Pat. No. 3,201,372, Column 3, line 60 to Column 4, line 3. From 0.1 to 10 parts by weight of a stabilizer per 100 parts of Component (2) are generally used.

It is particularly useful to use anywhere from 0 to about 500 parts by weight and preferably from 300 to 500 parts by weight per 100 parts of Component (2) of an inorganic filler in finely divided form, (e.g. with a particle size from 0.3 to 80 μm). Suitable inorganic fillers include e.g. barium sulphate (baryta) calcium carbonate (chalk), alumina trihydrate, kieselguhr and clays (e.g. kaolin), silica talc, quarts, ground shale, fly ash microspheres and the like. The use of a filler is not only advantageous for improving the general backing properties but also significantly enables the fabric to comply with burn tests, such as the Motor Vehicle Safety Standard 302, without the use of fire retardants, and improves the economics of the process. In general, the filler must be mixed, mechanically or otherwise, with the other resin blend components in a separate operation. Barium sulphates, calcium carbonate and alumina trihydrate are preferred.

According to the invention, it is also possible to use reaction retarders such as hydrochloric acid or organic acid halides; cell regulators such as paraffins or fatty alcohols or dimethyl polysiloxanes; pigments or dyes; flameproofing agents such as trischloroethylphosphate or ammonium phosphate and polyphosphate; stabilizers against the effects of ageing and weather; plasticizers; substances with fungistatic and bacteriostatic effects.

It has also been found advantageous to use an antioxidant in amounts varying from 0 to 0.5 part by weight per 100 parts of Components (2), (3), (4), (5) and (7). Examples include 2,6-di-t-butyl-4-methylphenol (BHT), hydroquinone, 4-t-butylcatechol, resorcinol, and 4-methoxyphenol (MEHQ).

Further examples of the surface-active additives and foam stabilizers optionally used in accordance with the invention, and of cell regulators, reaction retarders, stabilizers, flameproofing agents, plasticizers, dyes, fillers, substances with fungistatic and bacteriostatic effects, and details on the way in which these additives are to be used and how they work, are known and may be found, i.e., in Kunststoff-Handbuch, Vol. VI, published by Vieweg and Hochtlen, Carl-Hanser-Verlag, Munich, 1966, pages 103 to 113.

It is also preferred in some instances, to use dehydrating or water-binding agents in the process of the instant invention. The presently preferred agents are the alkali metal alumino-silicates (so-called molecular sieves) such as those known under the trade name "Zeolite" and described e.g. in U.S. Pat. No. 3,326,844. The oxides of calcium and barium may also be used. The dehydrating agents are generally used in a quantity sufficient to ensure that the maximum quantity of mositure which can be carried in with the fillers will be from about 1 to about 10% by weight, based on the polyurethane. It is preferred to use a Zeolite paste, particularly a sodium aluminum silicate as a 50% suspension in castor oil.

According to the instant invention, the reactants may be reacted together in a known manner by the one-step, prepolymer, semi-prepolymer or frothing process, often using mechanical devices such as those described in U.S. Pat. No. 2,764,565 are used. Details concerning suitable processing apparatus may be found, e.g., in Kunststoff-Handbuch, Volume VI, published by Vieweg and Hochtlen, Carl-Hanser-Verlag, Munich, 1966, pages 121 to 205.

Essentially any fabric may be used in the instant invention. They may be woven, non-woven, knitted, spun bonded, or felted, and made of natural or synthetic fibers and/or filaments. It is preferred, however, to use carpet type materials. The type of carpeting which is generally contemplated by the present invention includes any conventional carpet backing material (e.g., jute or polypropylene) and the fibers can be mechanically anchored to the first backing by any conventional means (e.g., by sewing, tufting or needle punching). The fibers can be composed of any conventional carpeting material (e.g., cotton, rayon, wool, nylon, acrylonitrile polymers, vinyl halide polymers, etc.). The fibers can be in any suitable form (e.g., in the form of pile yarns threaded through the first backing having cut or looped pile faces on the front side of the first backing). The froth can be applied to the first backing by any suitable procedure (e.g., knife coating). The backing can have any desired thickness (e.g., from 1/16 to 178 inch).

The reactive mass may either flow onto a suitable conveyor belt in front of a doctor knife and the fabric allowed to run thereon (reverse coating), or the mixture may be applied directly to the fabric in front of a doctor knife.

Any number of known pieces of equipment may be used to carry out the invention, e.g., low pressure mixheads with solvent flushes, conveyor means, heated molds, ovens and the like.

The polyurethane foam layer which results from the present process is generally between about 1 and about 25 mm thick and has a closed surface skin. The foam density will vary anywhere from 10 to 100, preferably 20 to 60 and most preferably from 30 to 50 lbs./ft$^3$.

The time, temperature, pressure and formulation parameters are all interdependent and the various choices will depend on the particular properties to be engineered. The following examples serve to explain the process of the invention. All parts and percentages are by weight unless otherwise indicated. In the examples, the following materials were used:

Polyol A is an ethylene oxide tripped polypropylene glycol with a molecular weight of 4800 and an OH number of 35.
Polyol B is a modified version of Polyol A with a Mw of 6000 and an OH number of 28.
DEG is diethylene glycol.
L6202 and
L 5612 are Union Carbide polysiloxane surfactants.
The catalyst is

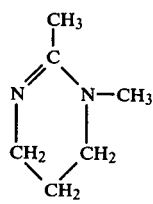

HEA is 2-hydroxyethyl acrylate.
HPA is 2-hydroxypropyl acrylate.
AIBN is azobis (isobutyronitrile).
Zeolith T Paste is a sodium-aluminum silicate type paste used as a dessicant.
CS-15 is a hydroxy terminated polybutadiene-styrene copolymer available from ARCO.
R45HT is a hydroxy terminated polybutadiene homopolymer available from ARCO.
Polyisocyanates A and B are polymethylene polyphenyl polyisocyanates with NCO contents of 31.5% and functionalities averaging from 2.6 to 2.7.
Polyisocyanate C is a polymethylene polyphenyl polyisocyanate with carbodiimide and uretonimine modification with a 30% NCO content and a functionality of about 2.
Polyisocyanate D is a liquid modified diphenyl methane diisocyanate with an NCO content of 22.6%.

EXAMPLES

The following method was followed in preparing the foam-backed carpets from the formulations mentioned in the Table below. All of the components except the filler and isocyanate were pre-blended. The filler (e.g., barium sulfate) was then mixed with the liquid resin blend via a feed hopper and static mixer. The polyisocyanate was then blended with the resin/filler in a mixhead. The effluent from the mixhead ran through a pipe into which an air nozzle is placed for injecting air into the mixture. The air-reactive component mix was then homogenized in a froth producing mixer.

The froth was dispensed onto the carpet via a reciprocating applicator and was evenly spread over the carpet by a doctor knife. The carpet was then placed in a heated oven for curing for about 4 minutes at an oven temperature of about 110° C.

At this point, the polyurethane backing was fully foamed and was in a tack-free gelled state. It could be stored in rolls for substantial periods of time. When a piece of moldable carpet is needed, the proper sized piece was cut off from the roll. In the present case, the piece was placed in a heated mold, under pressure, for the period of time indicated and then removed.

| | POLYOL A | CS15 | R45HT | DEG | Oleic Acid | Acetic Acid | L6202 | Catalyst | HEA | HPA | Di-Cumyl Peroxide | AIBN | Barium Sulfate | POLYISOCYANATE A | POLYISOCYANATE B | Index |
|---|---|---|---|---|---|---|---|---|---|---|---|---|---|---|---|---|
| 1 | 90 | — | 10 | — | — | .25 | 1.0 | 0.3 | 10 | — | — | 0.1 | 320 | — | 21 | 110 |
| 2 | 90 | — | 10 | — | — | .25 | 1.0 | 0.3 | — | 10 | — | 0.1 | 320 | — | 20 | 110 |
| 3 | 95 | — | — | 7 | 1.0 | — | 1.0 | 0.3 | 3 | — | — | 0.1 | 320 | — | 29 | 110 |
| 4 | 95 | — | — | 7 | 1.0 | — | 1.0 | 0.3 | 5 | — | — | 0.1 | 320 | — | 32 | 110 |
| 5 | 95 | — | — | 7 | 1.0 | — | 1.0 | 0.3 | 10 | — | — | 0.1 | 320 | — | 38 | 110 |
| 6 | 95 | — | — | 7 | 1.0 | — | 1.0 | 0.3 | — | 10 | — | 0.1 | 320 | — | 36 | 110 |
| 7 | 90 | 10 | — | — | — | .25 | 1.0 | 0.3 | 10 | — | 0.1 | — | 320 | — | 21 | 110 |
| 8 | 85 | 15 | — | — | — | .25 | 1.0 | 0.3 | 10 | — | — | 0.1 | 320 | — | 25 | 130 |
| 9 | 85 | 15 | — | — | — | .25 | 1.0 | 0.3 | 10 | — | — | 0.1 | 320 | 25 | — | 130 |

In Examples 1–6, the carpet was post shaped in a mold heated to 320° F. and pressed at 0.5 psi for approximately one minute. The carpets had been stored for three weeks following the initial spreading of the polyurethane reaction mixture onto the back of the carpet.

Each finished product had good to excellent moldability, stiffness and yet were flexible enough not to crack when flexed. They also had very good mold definition (i.e., the final foam surface duplicated the inside of the mold).

In Examples 7-9, the carpets had been stored for five weeks and were similarly molded but at a mold temperature of 280° F. Comparable results to the carpets of Examples 1-6 were obtained.

The use of only 3 or 5 parts of hydroxy ethyl acrylate in Examples 1 and 3 or 5 parts of hydroxy propyl acrylate in Examples 2 and 6 resulted in products with poorer moldability which were too soft to retain their molded shape.

Experiments similar to Examples 3-6 using polyisocyanate C at a 110 index also did not mold well. This is presumably due to the isocyanate's lower functionality.

Experiments similar to Examples 2 and 3 using 3, 5 and 10 parts of trimethylol propane di-2-propenyl ether $$CH_3-CH_2-\underset{\underset{CH_2OH}{|}}{C}-(CH_2-O-CH_2-CH=CH_2)_2$$

also resulted in foams without good shape retention. Apparently, only those compounds with carbon-carbon double bonds which are activated by a proximate carbonyl group (e.g. acrylates, methacrylates etc.) are effective.

EXAMPLE 10

The following formulation has been found to be particularly useful in preparing excellent molded fabrics by the same general method outlined in the above examples

| Polyol B | 88 |
| DEG | 12 |
| HEA | 10 |
| L5612 | 4.0 |
| AIBN | .3 |
| Catalyst | .45 |
| Oleic Acid | 1.0 |
| $BaSO_4$ | 320 |
| Polyisocyanate D 100 | (Index = 150) |

EXAMPLE 11

To 660 parts by weight of a polymethane polyphenyl polyisocyanate (85% dinuclear polymeric isocyanate, 15% wt. and higher nuclear and 10% of the dinuclear being 2,4' isomer) were added 125 parts by weight 2-hydroxyethyl acrylate at 40° C. over 10 minutes. The reaction mixture exothermed to 90° C. The batch was cooled to 80° C. and held at that temperature for one hour. The reaction product had an NCO content of 21.9%. This prepolymer can be effectively used as the isocyanate component (1) in the process of the present invention in the absence of additional hydroxy acrylate to form excellent molded foam-backed fabrics.

The foam-backed carpets in Examples 1-11 can survive the following physical testing conditions without suffering cracking.

(1) Heat ageing for 14 days at 70° C.;
(2) Cold ageing for 14 days at −30° C.;
(3) humid ageing for 72 hours at 35° C. and 100% relative humidity.

What is claimed is:

1. A process for preparing a molded, polyurethane foam-backed fabric comprising the steps of:

(A) applying a foamable mixture or froth of polyurethane reaction components to the back of a fabric, said reaction components consisting essentially of:
(1) a polyisocyanate;
(2) an organic compound containing at least two hydrogen atoms capable of reacting with isocyanate groups, having a molecular weight of between 400 and 16,000 and containing essentially no ethylenically unsaturated groups;
(3) hydroxyl containing esters of acrylic and alkyl acrylic acids;
(4) a free radical initiator;
(5) a heat activated catalyst for the reaction between components (1) and (2);
(6) a blowing agent, or inert gas for frothing;
(7) a surface active agent for foam stability;

(B) heating the coated fabric for from 15 seconds to 10 minutes at a temperature of from about 80° to about 250° F. to allow the polyurethane reaction to proceed to produce a fully foamed, gelled, tack-free polyurethane foam; and (C) thereafter molding the resultant foam-backed fabric by a hot-molding process to produce a complex shape.

2. The process of claim 1 wherein Step (C) comprises placing the fabric in a heated mold where at least the polyurethane side is subjected to temperatures of from 200° to 350° F. and a pressure of from 0.1 to 20 psi for from 15 seconds to 5 minutes.

3. The process of claim 1 wherein Step (C) comprises heating the fabric to a temperature of from 200° to 350° F. and then shaping the heated carpet in an unheated mold at a pressure of from 0.1 to 20 psi.

4. The process of claim 3, wherein the fabric is laid flat and heated by forced heated air, infrared radiation or microwave radiation.

5. The process of claim 1 wherein component (3) is represented by the formula

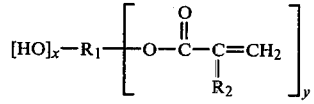

wherein $R_1$ is an x+y valent, optionally branched $C_1$-$C_{18}$ alkylene, arylene or aralkylene group $R_2$ is H or $C_1$-$C_{18}$ alkyl x & y are integers which may be the same or different and represent 1-8, with the proviso that x+y does not exceed 8.

6. The process of claim 5 wherein x and y are each 1, $R_1$ is a $C_1$ to $C_4$ alkylene and $R_2$ is H or methyl.

7. The process of claim 1 wherein said reaction components comprise

Component (1): in an amount such that the isocyanate index is from 100 to 200; 100 parts by weight of Component (2); of from 0.5 to 50 parts by weight of Component (3); from 0.01 to 1 part by weight of Component (4), said Component (4) being a thermally activated free radical initiator which has a half life of less than 1 minute at the molding temperature of Step (C); from 0.05 to 1 part by weight of Component (5); and further comprising (8) from 0 to 30 parts by weight of a chain extender;
(9) from 0 to 50 parts by weight of a compound containing at least one ethylenically unsaturated group and a hydroxyl group and being different than Component (3); and

(10) from 0 to 500 parts by weight of an inorganic filler based on the total weight of Components (2) to (9).

8. The process of claim 7 wherein the isocyanate index is from 125–150; and Component (3) is used in amounts of from 5 to 20 parts; Component (8) is used in amounts of from 0.5 to 30 parts; Component (9) is used in amounts of from 8 to 15 parts; and Component (10) is used in amounts of from 300 to 500 parts; the amounts of Components (3), (8), (9) and (10) being per 100 parts by weight of Component (2).

9. The process of claim 8 wherein from 8 to 15 parts of hydroxyfunctional acrylate and from 5 to 15 parts of chain extender is used.

10. The process of claim 9 wherein the acrylate is 2-hydroxyethyl acrylate or 2-hydroxypropyl acrylate.

11. The process of claim 1 wherein Component (1) and all of Component (3) are prereacted to form a preadduct.

12. The product of the process of claim 1.

13. The product of the process of claim 8.

* * * * *